United States Patent [19]

Togashi et al.

[11] Patent Number: 5,232,959
[45] Date of Patent: Aug. 3, 1993

[54] ORGANOHYDROGENPOLYSILOXANES AND CURABLE ORGANOSILOXANE COMPOSITIONS CONTAINING SAME

[75] Inventors: Atsushi Togashi; Akira Kasuya, both of Chiba, Japan

[73] Assignee: Dow Corning Toray Silicone Co., Ltd., Tokyo, Japan

[21] Appl. No.: 703,956

[22] Filed: May 22, 1991

[30] Foreign Application Priority Data

May 25, 1990 [JP] Japan .................. 2-136839
May 31, 1990 [JP] Japan .................. 2-142807

[51] Int. Cl.$^5$ .................. C08K 9/10; C08G 77/12; C07F 7/18
[52] U.S. Cl. .................. 523/211; 523/212; 528/15; 528/31; 528/32; 528/27; 556/451
[58] Field of Search .................. 523/211, 212; 528/15, 528/31, 32, 27; 549/215; 556/451

[56] References Cited

U.S. PATENT DOCUMENTS

| | | | |
|---|---|---|---|
| 3,761,444 | 9/1973 | Mendicino | 549/215 |
| 4,011,247 | 3/1977 | Sato et al. | 549/215 |
| 4,082,726 | 4/1978 | Mine et al. | 528/31 |
| 4,481,341 | 11/1984 | Schlak et al. | 523/211 |
| 4,684,709 | 8/1987 | Ona et al. | 528/27 |
| 4,721,764 | 1/1988 | Fujiki et al. | 528/31 |
| 4,721,994 | 1/1988 | Mine et al. | 428/450 |
| 4,874,667 | 10/1989 | Lee et al. | 528/15 |
| 4,902,739 | 2/1990 | Ona et al. | 549/215 |

FOREIGN PATENT DOCUMENTS

50-39345  4/1975  Japan .

*Primary Examiner*—Melvyn I. Marquis
*Assistant Examiner*—Karen A. Dean
*Attorney, Agent, or Firm*—Robert Spector

[57] ABSTRACT

This invention provides a novel class of organohydrogenpolysiloxanes that function as curing agents for organosiloxane compositions curable by a hydrosilylation reaction in addition to imparting excellent adhesion to the cured composition. This invention also provides curable organosiloxane compositions containing these novel organohydrogen-polysiloxanes. The compositions exhibit excellent adhesion to a variety of organic and inorganic substrates, including but not limited to metals, glasses, and plastics.

8 Claims, No Drawings

ORGANOHYDROGENPOLYSILOXANES AND CURABLE ORGANOSILOXANE COMPOSITIONS CONTAINING SAME

BACKGROUND OF THE INVENTION

1. Field of the Invention

The present invention relates to novel organosilicon compounds and to curable organosiloxane compositions containing these compounds. More particularly, this invention relates to a novel class of organohydrogenpolysiloxanes capable of curing organosiloxane compositions in addition to imparting excellent adhesion to the cured material when the composition is cured in contact with various types of substrates including metals, glasses, and plastics.

2. Background Information

Organopolysiloxane compositions which cure by the hydrosilylation reaction cure rapidly in deep sections without generating by-products, and are therefore useful in a broad range of applications, including but not limited to adhesives, potting materials and coating materials for electronic and electrical components, and as release coatings for papers and films.

A shortcoming of this type of organosiloxane composition is inferior adhesion to other materials. When a poorly adhering organosiloxane composition is used as a potting or coating material for electrical or electronic components, delamination or exfoliation is prone to occur, permitting infiltration of moisture and a decrease in adhesion.

Numerous methods have been proposed to improve the adhesion of organosiloxane materials cured by a hydrosilylation reaction. These methods include addition of various types of organosilanes or organosiloxanes as adhesion promoters. In the case of compositions containing an organosilane as the adhesion promoter, satisfactory adhesion of the cured material may not be obtained due to evaporation of the organosilane during curing. In addition, the properties of the cured product may be compromised. As a result, this approach is not entirely satisfactory.

Laid open Japanese Patent Application [Kokai or Unexamined] Number 75/39345 discloses organosiloxane compositions containing an organopolysiloxane as the adhesion promoter in combination with an organohydrogenpolysiloxane containing 3 to 6 silicon atoms in addition to silicon-bonded hydrogen atoms and an epoxy group and/or ester group. This composition does in fact develop a good adhesion to glass and to metals such as iron and aluminum, however, but only poor adhesion for recently developed engineering plastics such as polybutylene terephthalate (PBT), nylon-6, and polyphenylene sulfide (PPS).

One objective of the present invention is to provide curable organosiloxane compositions that develop excellent adhesion to a variety of substrates, including engineering plastics, during curing. A second objective is to provide a curing agent for organosiloxane compositions that also functions as an adhesion promoter for both organic and inorganic substrates.

SUMMARY OF THE INVENTION

The present inventors carried out extensive research directed at achieving the aforementioned objectives, and discovered that a strong adhesion to metals and glasses as well as plastics is developed by curable organosiloxane compositions when the organohydrogenpolysiloxane used as the curing agent for these compositions contains both a silicon-bonded epoxy-containing group and a trialkoxysilylalkyl group that are bonded to silicon through a sequence of at least two carbon atoms.

DETAILED DESCRIPTION OF THE INVENTION

The present invention relates to a curable organosiloxane composition comprising A) an organopolysiloxane containing at least 2 silicon-bonded alkenyl radicals in each molecule and exhibiting the average unit formula

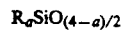

where R represents a halogenated or unsubstituted monovalent hydrocarbon radical and the value of a is from 1.0 to 2.3, B) an organohydrogenpolysiloxane containing a linear sequence of at least 5 siloxane units as the primary molecular structure, at least three silicon-bonded hydrogen atoms, at least one trialkoxysilylalkyl group, and at least 1 epoxy group-containing organic group, where said trialkoxysilylalkyl and epoxy-containing groups are bonded to different silicon atoms through at least two carbon atoms, and C) a hydrosilylation-reaction catalyst.

This invention also provides a novel organohydrogenpolysiloxane containing a linear sequence of at least five silicon atoms. Each molecule of this compound contains at least three silicon-bonded hydrogen atoms, at least one epoxy-containing group and at least one trialkoxysilylalkyl group. The epoxy-containing group and said trialkoxysilylalkyl group are bonded to different silicon atoms by a sequence of at least two carbon atoms and the organic groups bonded to silicon are monovalent hydrocarbon or halogenated hydrocarbon radicals.

The Organopolysiloxane (Ingredient A)

The organopolysiloxane referred to as ingredient A of the present compositions is the principle ingredient of the these compositions, and must contain at least 2 silicon-bonded alkenyl radicals groups in each molecule. The group R in the preceding average unit formula for this ingredient represents identical or different monovalent radicals exemplified by alkyl radicals such as methyl, ethyl, propyl, butyl, hexyl, and octyl; alkenyl radicals such as vinyl, allyl, and hexenyl; aryl radicals such as phenyl; and halogenated hydrocarbon radicals such as 3,3,3-trifluoropropyl. The value of a in this formula should be from 1.0 to 2.3.

The molecular structure of this organopolysiloxane comprises a linear or branched chain of siloxane units. While no specific restriction is placed on its degree of polymerization, the viscosity of ingredient A at 25° C. is typically from 10 to 1,000,00 centipoise.

The Organohydrogenpolysiloxane (Ingredient B)

Ingredient B of the present compositions is a novel compound that serves as the crosslinker for the organopolysiloxane referred to as ingredient A, and is also responsible for development of the excellent adhesion to other materials that characterizes cured products prepared from the present compositions.

Ingredient B is an organohydrogenpolysiloxane containing a linear sequence of at least 5 siloxane units, at least 1 trialkoxysilylalkyl group bonded to silicon through at least two carbon atoms, at least 1 epoxy group-containing organic group bonded to silicon through carbon at least two carbon atoms, and at least three silicon-bonded hydrogen atoms.

The combination of trialkoxysilylalkyl and epoxy-substituted groups in ingredient B is responsible for the excellent adhesion developed by the present compositions during curing.

The trialkoxysilylalkyl group of ingredient B contains a trialkoxysilyl group such as trimethoxysilyl, triethoxysilyl, triisopropoxysilyl or tri-n-butoxysilyl that is bonded to silicon through an alkylene radical such as ethylene, propylene or butylene.

Suitable epoxy substituted organic groups are exemplified by but not limited to the glycidoxypropyl group and epoxycyclohexylethyl group.

In addition to these adhesion promoting groups, it is also essential that each molecule of ingredient B contain at least 3 silicon-bonded hydrogen atoms in order for the curable composition to form a network structure.

Other than the aforementioned epoxy-containing and alkoxysilylalkyl groups, the silicon-bonded organic groups in ingredient B are monovalent hydrocarbon and halogenated hydrocarbon radicals as described for the R radical of ingredient A. These hydrocarbon and/or halogenated hydrocarbon radicals of ingredient B may be identical or different.

Furthermore, ingredient B must contain at least 5 silicon atoms per molecule. In the case of four or fewer silicon atoms, one encounters a poor reactivity by the silicon-bonded hydrogen atoms, due to factors as steric hindrance. The composition of the present invention exhibits an unsatisfactory cure, with the result that either the adhesive strength is simply reduced or the cure is entirely unacceptable. When a thorough completion of the curing reaction is critical, each molecule of ingredient B preferably contains an average of at least 4 silicon-bonded hydrogen atoms.

Ingredient B is exemplified but not limited to the following compounds.

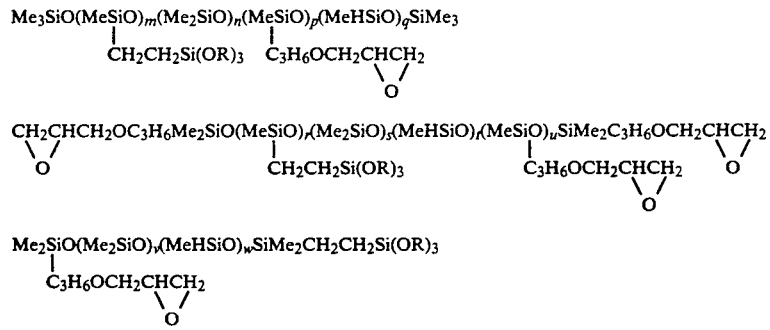

In these formulae m and p are integers with values of at least 1, n is zero or an integer with a value of at least 1, q is an integer with a value of at least 3, r and u are integers with values of at least 1, s is zero or an integer with a value of at least 1, t is an integer with a value of at least 3, v is zero or an integer with a value of at least 1 and w is an integer with a value of at least 3.

Organohydrogenpolysiloxane represented by these formulae can be readily prepared by the reaction, in the presence of a hydrosilylation-reaction catalyst, of an alkenyl substituted trialkoxysilane and an alkenyl-substituted epoxy compound with a portion of the silicon-bonded hydrogen atoms present on an organohydrogenpolysiloxane, a well known curing agent for typical alkenyl-substituted organopolysiloxanes which cure by the hydrosilylation reaction. Suitable alkenyl substituted trialkoxysilanes are exemplified by vinyltrialkoxysilanes, allyltrialkoxysilanes, and hexenyltrialkoxysilanes. Suitable alkenyl substituted epoxy compounds are exemplified by allyl glycidyl ether.

The siloxane units of ingredient B can have a straight-chain, network, or three-dimensional configuration. This ingredient can be a homopolymer, copolymer or a mixture of two or more polymers. Its degree of polymerization will correspond to a viscosity at 25° C. that is generally in the range of from 0.5 to 50,000 centipoise and preferably in the range of 1 to 10,000 centipoise.

The concentration of ingredient B in the present compositions is equivalent to a values for the molar ratio of silicon-bonded hydrogen atoms in this ingredient to alkenyl radicals in ingredient A of from 0.5:1 to 5:1. The concentration equivalent to this range of ratios is typically from 0.1 to 10 weight parts of ingredient B per 100 parts by weight of ingredient A.

The Hydrosilylation Reaction Catalyst

The hydrosilylation-reaction catalyst, referred to as ingredient C of the present compositions, encompasses all transition-metal catalysts known in the art to exhibit catalytic activity for hydrosilylation reactions. Specific examples of such catalysts include but are not limited to platinum-containing catalysts such as chloroplatinic acid, alcohol-modified chloroplatinic acid, chloroplatinic acid/olefin complexes, complexes between alkenylsiloxane and platinum or chloroplatinic acid, platinum black, and platinum supported on alumina, silica, and carbon black; palladium catalysts such as tetrakis(triphenylphosphine)palladium; and rhodium catalysts. Among these, platinum alkenylsiloxane complex catalysts and chloroplatinic acid/alkenylsiloxane complex catalysts are preferred for their high activity and compatibility with ingredients A and B. The concentration of ingredient C is typically equivalent to from 0.000001 to 0.1 weight parts, preferably from 0.00005 to 0.01 weight parts, of platinum or other transition metal per 100 weight parts of ingredient A.

Compositions containing a mixture of ingredients A, B, and C may begin to cure even at room temperature. For this reason compounds that inhibit the activity of the hydrosilylation catalyst can be added to curable organosiloxane compositions of this invention to increase the working time or provide short term storage stability. Typical hydrosilylation catalyst inhibitors include but are not limited to acetylenically unsaturated alcohols such as methylbutynol and 1-ethynylcycohexanol, and cyclic diorganosiloxanes wherein at least a portion of the silicon atoms are bonded to alkenyl radicals such as vinyl.

If it is desired to store the present composition as one-part compositions containing a platinum-containing hydrosilylation catalyst for extended periods of time, known catalyst inhibitors typically will not provide the desired level of storage stability. In this instance it is usually necessary to encapsulate the catalyst in finely divided particles of a thermoplastic resin exhibiting a softening point or glass transition temperature of from 50° to 200° C. These particles will be also be referred to as a micro-particulate catalyst-containing thermoplastic resin or as microparticles. In one embodiment of these microparticles the hydrosilylation-reaction catalyst is present as a core within a thermoplastic resin shell or skin. A second embodiment exhibits a structure in which the hydrosilylation-reaction catalyst is dissolved or dispersed in the microparticulate thermoplastic resin.

The thermoplastic resin portion of the encapsulated catalyst microparticles can be any resin that is essentially impermeable to the hydrosilylation-reaction catalyst at least during the period of storage and is essentially insoluble in the organopolysiloxane referred to as ingredient A.

Thermoplastic resins which can be used to encapsulate the catalyst (ingredient C) include but are not limited to acrylic resins, polystyrene, methyl cellulose, silicone resins, and polysilane resins.

The hydrosilylation-reaction catalyst, ingredient C, can be encapsulated within a microparticulate thermoplastic resin using any of the known methods. These methods included but are not limited to chemical methods such as interfacial polymerization and in-situ polymerization, physical-chemical methods such as coacervation and in-liquid drying, and physical-mechanical methods such as spray drying. Of these methods in-liquid drying and spray drying are preferred because they yield microparticles with a narrow particle size distribution in a relatively simple and straightforward manner.

The microparticles of catalyst-containing thermoplastic resin obtained using any of the methods described in the preceding paragraph can be used directly as a ingredient C. If it is desired achieve a superior level of storage stability for the curable composition, it is preferable to wash the microparticulate resin with an appropriate washing solvent in order to remove any catalyst adhering to the surface of the resin particles. Suitable washing solvents should not dissolve the thermoplastic resin, but should be capable of dissolving the hydrosilylation catalyst. Examples of suitable washing solvents include but are not limited to alcohols such as methyl alcohol and ethyl alcohol and low-molecular-weight organopolysiloxanes such as hexamethyldisiloxane.

The average particle size for the encapsulated catalyst should be within the range of from 0.01 to 100 micrometers, preferably within the range of from 0.1 to 10 micrometers. When the average particle size falls below 0.01 micrometers, there is a drastic decline in the yield of hydrosilylation-reaction catalyst obtained using known methods. When the average particle size exceeds 100 micrometers, the stability of the dispersed catalyst-containing microparticulate resin in the organopolysiloxane referred to as ingredient A of the present compositions is impaired.

The microparticulate resin preferably contains at least 0.01 weight percent of the hydrosilylation reaction catalyst.

Optional Ingredients

While the present compositions must contain ingredients A, B and C, additional ingredients can also be present in the curable composition so long as the objectives of the present invention are not compromised. These additional ingredients include but are not limited to finely divided forms of silica such as fumed silicas and wet-method silicas; surface-hydrophobicized microparticulate silicas; methylhydrogenpolysiloxanes having two silicon-bonded hydrogen atoms in each molecule, which are added for the purpose of adjusting the molar ratio between the silicon-bonded hydrogen atoms in ingredient B and the silicon-bonded alkenyl radicals in ingredient A; crepe-hardening inhibitors; the aforementioned hydrosilylation catalyst inhibitors such as phenylbutynol and triallyl isocyanurate to increase the working time and storage stability of the curable compositions; non-organopolysiloxane polymers; heat stabilizers, flame retardants, and fillers such as powdered quartz, diatomaceous earth, calcium carbonate, and glass fibers.

The present curable organosiloxane compositions can be prepared by mixing the aforementioned ingredients A through C to homogeneity. While compositions containing a hydrosilylation catalyst, ingredient C that is not encapsulated in a microparticulate thermoplastic resin can be cured by standing at room temperature, heating of these compositions is preferred to accelerate curing. In order to develop a particularly good adhesion to substrates that the organosiloxane composition is in contact with during curing, curing should be conducted at temperatures in the range of about 80° to about 150° C.

Curable compositions containing a hydrosilylation catalyst encapsulated within a microparticulate thermoplastic resin are preferably prepared by mixing and dispersing the encapsulated catalyst to homogeneity into a small quantity of ingredient A followed by the addition of this to the mixture of ingredients A and B. Any blending means can be used so long as it does not fracture or destroy the microparticulate resin sufficiently to liberate the hydrosilylation catalyst.

The maximum temperature to which curable compositions containing a resin-encapsulated catalyst can be exposed during preparation of these compositions cannot be unconditionally specified because this temperature will vary with the type of resin actually used. At the very least the temperature must not exceed the softening point of the thermoplastic resin used to encapsulate the catalyst.

The present compositions develop an excellent adhesion to various types of inorganic and organic substrates that the compositions are in contact with during curing. The compositions are therefore highly suitable for use as adhesives, potting agents and coating materials for electrical and electronic components.

EXAMPLES

The present invention is explained in greater detail below through illustrative examples, which should not be interpreted as limiting the scope of the invention defined in the accompanying claims. Unless other wise specified all parts in the examples are by weight, viscosities were measured at 25° C. Centigrade and cp represents centipoise. The adhesion testing and adhesive strength measurement cited in the examples were conducted according to the tensile shear test specified in ASTM D 1002-53T.

REFERENCE EXAMPLE 1

Preparation of Platinum/vinylsiloxane Complex

160 Grams of 1,3-divinyltetramethyldisiloxane and 32.0 g of chloroplatinic acid ($H_2PtCl_6.6H_2O$) were blended to homogeneity and then maintained at a temperature of 120° C. for 1 hour with stirring and under a nitrogen flow. The platinum black produced as a byproduct of the reaction was then removed by filtration and the acid was removed by washing with water, thereby yielding a reaction product containing a complex of platinum coordinated with 1,3-divinyltetramethyldisiloxane. The platinum metal concentration in this reaction product was 4.25%.

REFERENCE EXAMPLE 2

Preparation of a thermoplastic Silicone Resin

332 Grams phenyltrichlorosilane, 53 g dimethyldichlorosilane, and 110 g diphenyldichlorosilane were blended with 150 g toluene, and the resultant solution of mixed silanes was hydrolyzed by dripping the solution into a liquid composed of 430 g toluene, 142 g methyl ethyl ketone, and 114 g water. This reaction mixture was washed with water to remove the hydrogen chloride, and the organic phase was then separated off. The methyl ethyl ketone was removed by heating. 0.2 Grams of potassium hydroxide was then added followed by heating and distillation of the produced water. The resultant liquid reaction mixture was neutralized with acetic acid, following by repeated washing with water, at then evaporation of the solvent to yield a thermoplastic silicone resin exhibiting a glass-transition temperature of 65° C. and a softening point of 85° C.

REFERENCE EXAMPLE 3

Preparation of Platinum-Containing Silicone Resin Microparticles the following ingredients were introduced into a stirrer-equipped glass reactor and blended to homogeneity: 900 g of the thermoplastic silicone resin described in Reference Example 2, 500 g toluene, and 4,600 g dichloromethane. This was followed by the introduction of 44.4 g of the platinum/vinylsiloxane complex composition described in Reference Example 1, and the resultant mixture was stirred to obtain a homogeneous solution containing the platinum/vinylsiloxane complex and thermoplastic silicone resin. Using a dual-flow nozzle and a flow of heated nitrogen, this solution was continuously sprayed into a spray dryer chamber obtained from Ashizawa Nitro Atomizer K.K. The temperature of the nitrogen was 95° C. at the inlet to the spray dryer, 45° C. at the outlet from the spray dryer, and the nitrogen flow rate was 1.3 m³/minute.

After operation of the spray dryer for 1 hour, 450 g silicone resin microparticles had been recovered using a bag filter. The microparticles had an average particle diameter of 1.1 micrometers, contained 0.5 weight % of microparticles larger than 5 micrometers and 0.4 weight percent of platinum. Observation by scanning electron microscopy confirmed that these microparticles had a spherical morphology.

REFERENCE EXAMPLE 4

Preparation of Platinum Catalyst-Containing Silicone Resin Microparticles

The following ingredients were dissolved in 330 g of methylene chloride: 1.6 g of the platinum/vinylsiloxane complex catalyst obtained as described in Reference Example 1 and 16.0 g of a silicone resin. The resin exhibited a softening point of 90° C. and contained 18 mole % diphenylsiloxane units, 17 mole % dimethylsiloxane units, and 65 mole % monophenylsiloxane units. The resultant solution was added with stirring to water which contained 15 g polyvinyl alcohol available as Gosenol GL-05 from Nippon Gosei Kagaku Kogyo K.K., and the methylene chloride was then evaporated off over 48 hours at 25° to 40° C. The solids were recovered from the resultant suspension by centrifugation. These solids were washed with water and then with a large quantity of methyl alcohol to yield a platinum catalyst-containing silicone resin microparticulate catalyst containing 0.40% platinum and exhibiting an average particle diameter of 1 micrometer.

REFERENCE EXAMPLE 5

Preparation of Platinum Catalyst-Containing Polystyrene Microparticles 8.0 Grams of polystyrene exhibiting a glass-transition temperature of 82° C. and 1.0 g of the platinum/vinylsiloxane complex catalyst described in Reference Example 1 were dissolved in 165 g methylene chloride. This methylene chloride solution was added with stirring to water containing 7.5 g polyvinyl alcohol available as Gosenol GL-05 from Nippon Gosei K.K., and the methylene chloride was evaporated off over 40 hours at 25° to 40° C. The solids were isolated from the resultant suspension by centrifugation. The solids were then washed in succession with water, a large quantity of methyl alcohol, and finally with hexamethyldisiloxane to yield an encapsulated platinum catalyst with an average particle size of 7 micrometers and a platinum content of 0.24%.

EXAMPLE 1

This example describes a preferred curing agent of this invention and the use of a platinum catalyst inhibitor to impart short-term storage stability to the curable organosiloxane composition.

The following ingredients were blended to homogeneity: 100 parts of a dimethylvinylsiloxy-terminated dimethylpolysiloxane exhibiting a viscosity of approximately 2,000 cp (2 Pa·s) and 20 parts of a microparticulate silica exhibiting a specific surface area of approximately 200 m²/g and a surface that had been hydrophobicized with hexamethyldisilazane. To the resultant mixture was added 0.01 part 3,5-dimethyl-3-hexynol and 3.0 parts of an organohydrogenpolysiloxane corresponding to the average molecular formula B1.

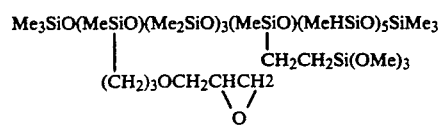

The hydrosilylation reaction catalyst was prepared by reacting 1,3-divinyltetramethyldisiloxane with chloroplatinic acid ($H_2PtCl_6.6H_2O$) as described in reference example 1 to yield a product containing a platinum complex in which 1,3-divinyltetramethyldisiloxane was coordinated. 0.015 part of this complex containing 4.3 weight % of platinum was blended into the mixture described in the preceding section of this example to yield a curable organopolysiloxane composition.

The curable composition was placed between six pairs of test panels, both formed from the same material, and cured by heating it in an oven maintained at 120° C. for one hour. The panels were formed from aluminum, iron, Bakelite(®), a glass fiber-reinforced epoxy resin, polybutylene terephthalate (PBT), and glass. The resultant test specimens contained the two test panels bonded into a single body through the cured product formed from the organopolysiloxane composition.

The test specimens were placed in a tensile tester and its adhesive strength measured. These results of these measurements are reported in Table 1.

For comparison, a curable organosiloxane composition was prepared using same ingredients described in the first section of this example, with the exception that the organohydrogen-polysiloxane represented by formula B1 was replaced with 0.87 g of a methylhydrogenpolysiloxane of formula B2

  (B2)

where Me represents methyl, as the curing agent. The adhesive strength was measured as described in the preceding section of this example, above, and these results are also reported in Table 1.

TABLE 1

| substrate | Example 1 adhesive strength, kg/cm² | Comparison Example 1 adhesive strength, kg/cm² |
|---|---|---|
| aluminum | 32 | ≦5 |
| iron | 38 | ≦5 |
| Bakelite | 35 | ≦5 |
| epoxy/glass | 36 | ≦5 |
| PBT | 25 | ≦5 |
| glass | 30 | ≦5 |

EXAMPLE 2

The following ingredients were blended to homogeneity: 58 parts of a dimethylvinylsiloxy-terminated dimethylpolysiloxane with a viscosity of approximately 2,700 cp (2.7 Pa·s); 13 parts of a polysiloxane exhibiting a viscosity of approximately 10 cp (0.01 Pa·s) and consisting of trimethylsiloxy units, dimethylvinylsiloxy units, and SiO$_{4/2}$ units; 17 parts powdered quartz with an average particle size of approximately 5 microns; and 12 parts microparticulate silica exhibiting a specific surface area of approximately 200 m²/g which had been surface-hydrophobicized with hexamethyldisilazane.

To the resultant mixture were added with blending to homogeneity 6.8 parts of the same organohydrogenpolysiloxane (B1) used in Example 1 and 0.02 parts of the same platinum complex-containing hydrosilylation reaction catalyst used in Example 1. This curable composition was placed between nine pairs of test panels, both formed from the same material. The compositions were cured by heating them at 120° C. for 1 hour in an oven to yield a test sample in which the two test panels were bonded into a single body through the cured product of the organopolysiloxane composition. The test panels were formed form aluminum, copper, iron, nickel, brass, Bakelite(®), epoxy/fiberglass composite, PBT and nylon-6. The adhesive strength and bonding status of the sample were then measure. The results of these measurements appear in Table 2.

For purposes of comparison, an organopolysiloxane composition was prepared as described in the preceding section of this example, but replacing the organohydrogenpolysiloxane with 4.9 parts of an organohydrogenpolysiloxane corresponding to formula B3.

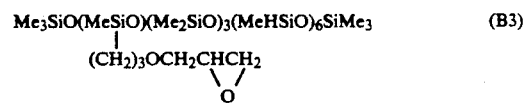  (B3)

in place of the organohydrogenpolysiloxane with formula (B1) as used in Example 1. Adhesion testing was also conducted as above, and these measurement results are reported in Table 2.

TABLE 2

| | Example 2 | | Comparison Example 2 | | Comparison Example 3 |
|---|---|---|---|---|---|
| substrate | adhesive strength kg/cm² | bonding status | adhesive strength kg/cm² | bonding status | bonding status |
| aluminum | 38 | ++ | 38 | ++ | — |
| copper | 38 | ++ | 10 | + | — |
| iron | 38 | ++ | 37 | ++ | — |
| nickel | 37 | ++ | 28 | + | — |
| brass | 34 | ++ | 20 | + | — |
| Bakelite | 34 | ++ | 32 | ++ | — |
| epoxy/glass | 37 | ++ | 31 | ++ | — |
| PBT | 26 | ++ | 14 | x | x |
| nylon-6 | 28 | ++ | 14 | x | x |

++ more than 95% cohesive failure (fracture in the cured layer formed from the organopolysiloxane composition)
+ 5 to 95% cohesive failure
x interfacial delamination (separation at the interface between the substrate and the cured layer formed from the organopolysiloxane composition)

EXAMPLE 3

A curable organopolysiloxane composition was prepared as described in Example 2, but replacing the curing agent represented by formula B1 with 4.0 parts of the organohydrogenpolysiloxane represented by formula B4

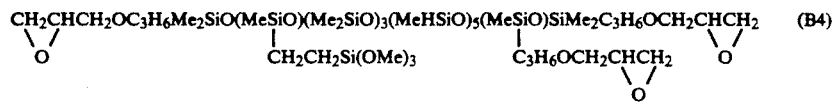  (B4)

and 2.0 parts of the organohydrogenpolysiloxane represented by formula B5

  (B5)

This composition was subjected to adhesion testing as described in Example 2 using test panels of PBT and nylon-6, and the bonding status was rated as entirely cohesive failure in each case.

For comparison, an organopolysiloxane composition was prepared as above with the modification that 2.0 parts of the organohydrogenpolysiloxane corresponding to formula B6

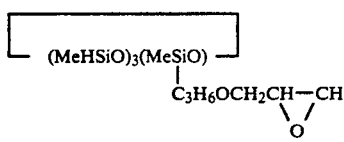
(B6)

was used in place of organohydrogenpolysiloxane (B4). When this composition was subjected to adhesion testing as described in the preceding examples the bonding status was rated as entirely interfacial failure.

Also for comparison, an organopolysiloxane composition was prepared as above with the modification that 2.0 parts organohydrogenpolysiloxane corresponding to formula B7

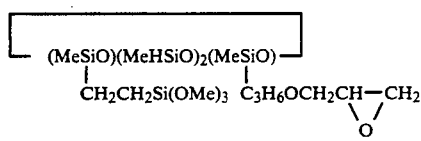
(B7)

was used in place of organohydrogenpolysiloxane B4. This composition was subjected to adhesion testing as described in Example 2 against PBT and nylon-6. The results for the bonding status were entirely due to delamination at the interface.

EXAMPLE 4

Preparation of a Storage-Stable Organosiloxane Composition

The following ingredients were blended to homogeneity: 100 parts dimethylvinylsiloxy-terminated dimethylpolysiloxane exhibiting a viscosity approximately 2,000 cp (2 Pa.s) and 20 parts microparticulate silica exhibiting a specific surface area of approximately 200 $m^2/g$, the surface of the silica having been previously hydrophobicized with hexamethyldisilazane. To the resultant mixture was added 0.02 parts 3,5-dimethyl-3-hexynol and 3.0 parts organohydrogenpolysiloxane with the molecular formula B1 of Example 1

A thermosetting organosiloxane composition of this invention was prepared by the addition with mixing of the platinum catalyst-containing silicone resin microparticles described in Reference Example 3 in an amount equivalent to a platinum content of 5 ppm in the composition.

The curable composition was placed between six pairs of two identical test panels formed from aluminum, copper, iron, Bakelite(®), epoxy/glass, polybutylene terephthalate (PBT), and glass. The composition was cured by heating the resultant composites at 120° C. for 1 hour in an oven to yield a composite in which the two test panels were bonded together to form a unitary body through the cured product formed from the organosiloxane composition.

The adhesive strength of the composites was measured using a tensile tester and the tensile shear test described in ASTM test method D 1002-53T. These results of the measurements are reported in Table 3.

For purposes of comparison, a curable organosiloxane composition was prepared as described in the preceding section of this example, but adding 0.87 parts of the cyclic methylhydrogenpolysiloxane identified as B2 in the preceding Example 1 as the curing agent in place of organohydrogensiloxane B1. The adhesive strength was measured for this composition using the same test panels, and these measurement results are also reported in Table 3 as Comparison Example 4.

TABLE 3

| substrate | Example 4 adhesive strength (kg/cm$^2$) | Comparison Example 4 adhesive strength, (kg/cm$^2$) |
|---|---|---|
| aluminum | 32 | ≦5 |
| copper | 34 | ≦5 |
| iron | 35 | ≦5 |
| Bakelite | 35 | ≦5 |
| epoxy/glass | 35 | ≦5 |
| PBT | 25 | ≦5 |
| glass | 30 | ≦5 |

A thermosetting organopolysiloxane composition was also prepared as above by adding the platinum/vinylsiloxane complex as prepared in Reference Example 1 (final platinum content=5 ppm) in place of the platinum catalyst-containing thermoplastic microparticulate catalyst.

When the storage stability of this composition was evaluated, it was found that the composition of Comparison Example 4 was cured after 10 days at 25° C., while the composition of Example 4 was not cured even after 90 days.

EXAMPLE 5

The following ingredients were thoroughly mixed: 58 parts dimethylvinylsiloxy-terminated dimethylpolysiloxane with a viscosity of approximately 2,700 cp; 13 parts polysiloxane exhibiting a viscosity of approximately 10 cp (0.01 Pa.s) and composed of trimethylsiloxy groups, dimethylvinylsiloxy groups, and $SiO_{4/2}$ units; 17 parts powdered quartz with an average particle size of approximately 5 microns; and 12 parts microparticulate silica exhibiting a specific surface area of approximately 200 $m^2/g$ which had been surface-hydrophobicized with hexamethyldisilazane. This was followed by the addition with mixing to homogeneity of 6.8 parts of the organohydrogenpolysiloxane identified as B1 in the preceding Example 1, 0.24 parts of the microparticulate silicone resin-encapsulated platinum catalyst prepared as described in Reference Example 4, and 0.03 parts 3-phenyl-3-butynol.

This curable composition of the present invention was placed between two aluminum test panels, a test specimen was prepared as described in Example 1, and adhesive strength and bonding status of the test specimen were evaluated by adhesion testing also as in Example 1. The initial adhesive strength was 38 kg/cm$^2$, the adhesive strength after 60 days at 40° C. was 35 kg/cm$^2$, and in each case there was cohesive failure of the bond.

EXAMPLE 6

A curable organopolysiloxane composition was prepared as described in Example 5, but in this case using the platinum catalyst-containing silicone resin microparticulate prepared as described in Reference Example 3 in place of the platinum catalyst-containing silicone resin microparticulate from Reference Example 4. This composition was subjected to adhesion testing as in Example 5 against pairs of identical panels prepared from aluminum, copper, iron, nickel, brass, Bakelite(®), epoxy/glass panels (glass fiber-reinforced epoxy resin), PBT, nylon-6, and glass to evaluate the bonding status.

For comparison, a thermosetting organopolysiloxane composition was prepared as above, but in this case adding 5.1 parts organohydrogenpolysiloxane with the following formula B8

Me$_3$SiO(Me$_2$SiO)$_3$(MeHSiO)$_7$SiMe$_3$, (B8)

1.0 parts vinyltrimethoxysilane, and 0.7 parts allyl glycidyl ether in place of polysiloxane B1. This composition was subjected to adhesion testing as described in the preceding examples of the present specification, and the measurements are reported in Table 4 as Comparison Example 6.

TABLE 4

| substrate | Example 6 | Comparison Example 6 |
|---|---|---|
| aluminum | + | + |
| copper | + | + |
| iron | + | − |
| nickel | + | − |
| brass | + | − |
| Bakelite | + | + |
| epoxy/glass | + | − |
| PBT | + | − |
| nylon-6 | + | − |
| glass | + | + |

+ cohesive failure (at least 95% cohesive failure = fracture in the cured layer formed from the organopolysiloxane)

− interfacial (failure at the interface between the substrate and the cured layer formed from the organopolysiloxane composition)

The following results were obtained when the storage stabilities of these compositions were evaluated: the composition of Example 6 was not cured even after 60 days at 40° C., while the composition of Comparison Example 6 was cured after 5 days.

EXAMPLE 7

The following ingredients were mixed to homogeneity: 100 parts of a dimethylvinylsiloxy-terminated dimethylpolysiloxane with a viscosity of approximately 2,000 centipoise (2 Pa·s) and 20 parts microparticulate silica exhibiting a specific surface area of approximately 200 m$^2$/g. The surface of the silica had been hydrophobicized by treatment with hexamethyldisilazane.

A thermosetting organopolysiloxane composition of this invention was then prepared by the subsequent addition of 3.1 parts organohydrogenpolysiloxane represented by formula B4 in Example 3 and 0.2 parts platinum catalyst-containing polystyrene microparticles prepared as described in Reference Example 5. Approximately 10 g of this composition was introduced into an 6 cm-diameter aluminum cup and cured for 30 minutes in a drying oven at 130° C. The bonding status between the cured composition and the cup was then evaluated. It was found that the cured material strongly bonded to the aluminum cup. When forcibly peeled, cohesive failure was observed in which fracture occurred within the cured material.

When the storage stability of the curable composition was investigated, it was found that this composition was not cured even after standing for 90 days at 25° C.

That which is claimed is:

1. A linear organohydrogenpolysiloxane containing in each molecule at least five organosiloxane groups, at least three silicon-bonded hydrogen atoms, at least one epoxy-containing group and at least one trialkoxysilylalkyl group, where said epoxy-containing group and said trialkoxysilylalkyl group are bonded to different silicon atoms through at least two carbon atoms and where the organic groups bonded to silicon are unsubstituted monovalent hydrocarbon or halogenated hydrocarbon radicals.

2. An organohydrogenpolysiloxane according to claim 1 where at least 50 percent of said organic groups are methyl and any remainder are selected from the group consisting of phenyl and 3,3,3-trifluoropropyl.

3. An organohydrogenpolysiloxane according to claim 2 which is selected from the group consisting of

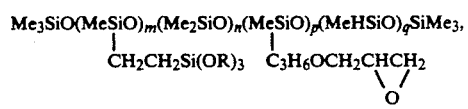

where R represents a methyl, ethyl, isopropyl or n-butyl radical m and p are integers with values of at least 1, n is zero or an integer with a value of at least 1, and q is an integer with a value of at least 3;

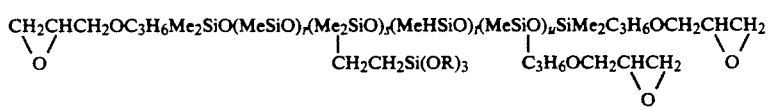

where r and u are integers with values of at least 1, s is zero or an integer with a value of at least 1, and t is an integer with a value of at least 3; and

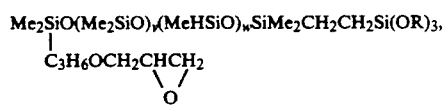

wherein v is zero or an integer with a value of at least 1 and w is an integer with a value of at least 3.

4. In a curable organosiloxane composition comprising

A) an organopolysiloxane containing at least 2 silicon-bonded alkenyl radicals in each molecule and exhibiting the average unit formula R$_a$SiO$_{(4-a)/2}$ where R represents a monovalent hydrocarbon or halogenated hydrocarbon radical and the value of a is from 1.0 to 2.3, B) as the only organohydrogenpolysiloxane present in said composition, a linear organohydrogenpolysiloxane containing in each molecule at least five organosiloxane groups, at least three silicon-bonded hydrogen atoms, at least one epoxy-containing group and at least one trialkoxysilylalkyl group, where said epoxy-containing group and said trialkoxysilylalkyl group are bonded to different silicon atoms through at least two carbon atoms and where the organic groups bonded to silicon are unsubstituted monovalent hydrocarbon or halogenated hydrocarbon radicals, and C) a hydrosilylation-reaction catalyst.

5. A composition according to claim 4 wherein said alkenyl radical is vinyl and the remaining radicals represented by R are selected from the group consisting of methyl, phenyl and 3,3,3-trifluoropropyl, said hydrosilylation-reaction catalyst is a platinum-containing compound or complex, and the organohydrogenpolysiloxane is selected from the group consisting of

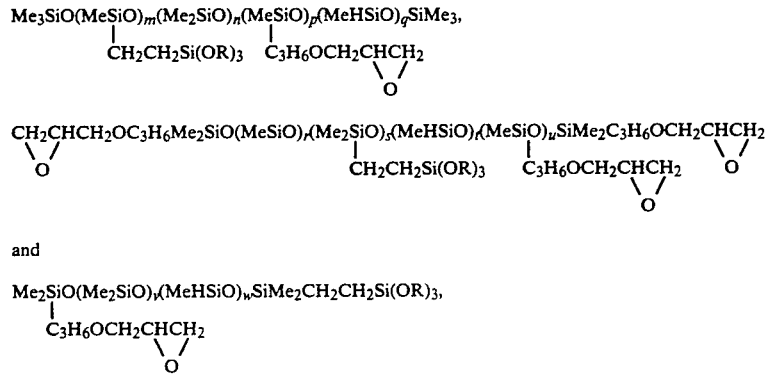

and where m and p are integers with values of at least 1, n is zero or an integer with a value of at least 1, and q is an integer with a value of at least 3, r and u are integers with values of at least 1, s is zero or an integer with a value of at least 1, t is an integer with a value of at least 3, v is zero or an integer with a value of at least 1 and w is an integer with a value of at least 3.

6. A composition according to claim 5 wherein said catalyst is selected from the group consisting of complexes of platinum with alkenyl-substituted siloxanes and complexes of chloroplatinic acid with alkenyl-substituted siloxanes.

7. A composition according to claim 4 where said hydrosilylation reaction catalyst is in the form of a microparticulate thermoplastic resin containing at least 0.01 weight % of said catalyst, and wherein the thermoplastic resin has a softening point of 50° to 200° C. and the average particle diameter of the microparticulate thermoplastic resin is from 0.01 to 100 micrometers.

8. A composition according to claim 7 where said thermoplastic resin is a silicone resin.

* * * * *